Patented July 3, 1945

2,379,535

UNITED STATES PATENT OFFICE 2,379,535

WETTING AND EMULSIFYING AGENTS

Kathryn L. Lynch and Herbert J. West, Old Greenwich, Conn., assignors to American Cyanamid Company, New York, N. Y., a corporation of Maine No Drawing. Application December 31, 1941, Serial No. 425,230

2 Claims. (Cl. 260—480)

This invention relates to new compounds having wetting, dispersing, foaming, detergent, and other useful surface active properties. The invention includes the new compounds, their preparation, and compositions containing them.

We have found that new organic compounds may be prepared by methods to be presently described and that such compounds are of considerable value in many arts for a wide variety of purposes because of their surface active properties. These compounds which may be designated as N-substituted aspartic acid esters may be prepared by reacting a dialkyl maleate of the formula

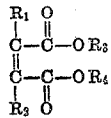

in which $R_1$ and $R_2$ are members of the group consisting of hydrogen, alkyl and aryl hydrocarbon radicals, and $R_3$ and $R_4$ are alkyl radicals of at least 4 carbon atoms; with a primary amine having the formula $XSO_3RNH_2$, in which X is hydrogen or a salt-forming radical and R is an alkylene radical.

The reaction which takes place to yield the compounds of the present invention may be illustrated generally as follows:

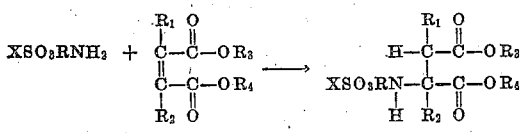

Ordinarily, it is most convenient to carry out the reaction with the reactants dissolved in a suitable inert solvent such as water, ethyl alcohol, acetone, etc. When employing the sulfo alkyl amines, the reaction may be carried to substantial completion by merely agitating the reactants in the reaction vessel at room temperature. It will also be found that the maleic esters of lower molecular weight react more rapidly than the higher members of the series and therefore the time of reaction will be determined in each case by the particular compounds employed and the yield desired. The rate of the reaction may be increased somewhat by the application of heat to the reaction mixture up to temperatures of 150° C. Control of the reaction temperature is easily accomplished by choosing a solvent having an appropriate boiling point and heating the mixture under refluxing conditions. After the reaction has been carried to the desired degree of completion, the product may be recovered by simple evaporation of the solvents.

Primary amines having the general formula $XSO_3RNH_2$ which are useful in the practice of our invention include those such as beta amino ethane sulfonic acid (taurine), beta amino propane alpha sulfonic acid, alpha amino propane beta sulfonic acid, alpha amino butane beta sulfonic acid and the sodium, potassium, lithium, ammonium, barium, calcium, magnesium, zinc, copper, mercury, cadmium, ethanolamine, morpholine, guanidine, pyridine, and other organic and inorganic salts of these compounds.

Dialkyl esters of maleic acid capable of condensing with the above and similar amines to form wetting agents in accordance with our invention have the general formula

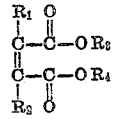

in which $R_1$ and $R_2$ are members of the group consisting of hydrogen, alkyl and aryl radicals and $R_3$ and $R_4$ are alkyl radicals of at least 4 carbon atoms. $R_1$ and $R_2$ are non-functional groups; i. e., they take no part in the condensation of the primary amine with the dialkyl ester, but they influence the wetting properties of the finished product. $R_3$ and $R_4$ may represent the same or different alkyl radicals of at least 4 carbon atoms, as for example $R_3$ may be a hexyl and $R_4$ may be an octyl radical. Specifically, $R_3$ and $R_4$ may be n-butyl, amyl, hexyl, octyl, methyl amyl, ethyl hexyl, capryl, decyl, lauryl, stearyl and like radicals. Specific examples of the dialkyl esters that may be employed in our invention are diamyl maleate, dibutyl maleate, dicapryl maleate, di-(methyl amyl) maleate, di-(ethyl hexyl) maleate, di-(1-methyl-4 ethyl hexyl) maleate, di-n-hexyl maleate, didecyl maleate, dihexyl-alpha-phenyl maleate, dihexyl citraconate, dicapryl pyrocinchonate, hexyl-octyl maleate and the like.

The invention will now be illustrated in greater detail by means of the following specific example. It should be understood, however, that although this example may describe in detail some specific manipulative steps which may be employed in the preparation of the compounds, it is given primarily by way of illustration and the invention in its broader aspects is not to be limited thereto.

EXAMPLE 25 parts by weight (0.2 mole) of taurine ($HSO_3CH_2CH_2NH_2$) was dissolved in 40 parts by weight of water containing 8 parts by weight (0.2 mole) of NaOH. This solution was agitated with 68 parts by weight (0.2 mole) of dioctyl maleate dissolved in 59 parts by weight of ethyl alcohol at room temperature. The solvent was then evaporated to yield dioctyl N-(beta-sodium sulfo ethyl) aspartate, a soft, white, waxy solid having the formula

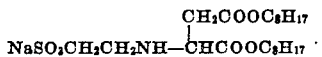

This compound dissolved readily in water to give clear, strongly foaming solutions having high wetting power. Aqueous solutions of the compound gave the following results when subjected to the standard Draves sinking test. This test measures the wetting power of the solution in terms of the time necessary for a weighted skein of unbleached cotton yarn to sink when immersed in the solution.

DRAVES TEST AT 30° C.

*Dioctyl N-(beta-sodium sulfo ethyl) aspartate*

| Concentration in grams per liter | Sinking time, seconds |
|---|---|
| 0.465 | 17.5 |
| 0.323 | 19.0 |
| 0.245 | 24.0 |
| 0.185 | 37.0 |
| 0.140 | 70.0 |

The compounds of the present invention are both anionically and cationically surface active. Most of them are easily dissolved in water to give clear, foaming solutions having a pH of about 7.0–8.0. They show wetting, emulsifying, de-emulsifying, dispersing, foaming, detergent, and other surface active characteristics and may be employed in many arts for a wide variety of purposes.

They are useful in the textile industry as softening, wetting, rewetting, penetrating and carbonizing agents; and in the leather industry, for wetting out, soaking, deliming, and bating hides, and in tanning, dyeing, fat-liquoring and stuffing preparations. They are also of value in disinfectants, fungicides and horticultural sprays because of their wetting and penetrating properties. They may also be employed in aqueous and organic solutions to lower the surface tension thereof. They are also of value in sprays designed to lay dusts arising from many types of industrial operations.

As detergents they may be used alone or with soaps and other materials having detergent properties such as tetrasodium pyrophosphate, sodium tetraphosphate, sodium hexametaphosphate and with materials which may be added for some other particular purpose such as bulking agents, abrasives, perfumes, boric acid, borax, etc.

The compounds of the present invention may also be used as emulsifying agents alone or with protective colloids such as glue, casein, starch, gums, and other emulsifying aids such as fatty acids, fatty acid esters, fatty alcohols, pine oil, bentonite, clays, carbon black, etc.

The compounds of our invention may also be employed as dispersing agents and are particularly valuable in dispersing pigments and dyes as in the preparation of printing pastes and other compositions where a pigment or dyestuff needs to be wetted in order that it may be dispersed properly.

The compounds described herein are also excellent de-emulsifying agents and may be employed to break, or resolve, emulsions particularly petroleum emulsions of the water-in-oil type such as are frequently encountered in well drilling operations in the oil industry. Other petroleum emulsions, such as are found in crude or refined oil storage tanks, emulsions formed by the washing of oil with water, emulsions obtained from the hydraulic flooding of oil fields and from treating crude or refined petroleum with various preparations, also may be resolved by treating the emulsions with our compounds in amounts of from 1 part of our new compounds to 100 to 20,000 parts of the oil emulsion treated.

Our new compounds are also valuable for many miscellaneous applications such as dye assistants where they act as levelling agents, penetrants, dispersants, etc., and are useful as surface active agents in ore dressing, cyanidation processes, dry cleaning compositions, glass cleaning preparations, as introfiers, adhesives, in wall paper pastes, shoe polishes, cleaning paper mill felts, rinsing, foaming agents, leaching and extracting processes, electroplating baths, pickling baths, etc., as lubricants alone or with animal or vegetable fats or oils, hydrocarbon oils, etc.

The compounds described herein are very similar in their behavior as wetting, rewetting, dispersing, emulsifying and de-emulsifying properties to the esters of sulfodicarboxylic acids described by Jaeger in U. S. Patent No. 2,028,091, dated January 14, 1936, and they may be employed for all the purposes for which these sulfodicarboxylic acid esters are useful.

What we claim is:

1. Dioctyl N-(beta-sodium sulfo ethyl) aspartate.

2. A process for the production of dioctyl N-(beta-sodium sulfo ethyl) aspartate, which comprises reacting beta-sodium sulfo ethyl amine with dioctyl maleate.

KATHRYN L. LYNCH.
HERBERT J. WEST.